(12) United States Patent
Strange et al.

(10) Patent No.: US 6,857,256 B2
(45) Date of Patent: Feb. 22, 2005

(54) LAWN MOWER CHUTE OPENING APPARATUS AND METHOD

(76) Inventors: Harry R. Strange, 1177 Seventh Ave., Gotha, FL (US) 34734; Dale W. Strange, 1177 Seventh Ave., Gotha, FL (US) 34734

( * ) Notice: Subject to any disclaimer, the term of this patent is extended or adjusted under 35 U.S.C. 154(b) by 0 days.

(21) Appl. No.: 10/693,379

(22) Filed: Oct. 24, 2003

(65) Prior Publication Data

US 2004/0083702 A1 May 6, 2004

Related U.S. Application Data

(60) Provisional application No. 60/421,460, filed on Oct. 25, 2002.

(51) Int. Cl.[7] .............................................. A01D 67/00
(52) U.S. Cl. ....................... 56/320.2; 56/17.4
(58) Field of Search ................................ 56/320.2, 202, 56/17.4, 320.1, DIG. 20, DIG. 24

(56) References Cited

U.S. PATENT DOCUMENTS

| | | | | |
|---|---|---|---|---|
| 3,816,986 A | * | 6/1974 | Van Der Gaast | .............. 56/202 |
| 3,893,284 A | * | 7/1975 | Thon et al. | ................... 56/202 |
| 3,949,540 A | * | 4/1976 | Christopherson et al. | ..... 56/202 |
| 4,135,351 A | * | 1/1979 | Akgulian | ...................... 56/255 |
| 4,203,276 A | * | 5/1980 | Plamper | ....................... 56/202 |
| 4,445,312 A | * | 5/1984 | Cartner | ........................ 56/15.5 |
| 4,800,712 A | * | 1/1989 | Morse et al. | ................. 56/202 |
| 5,040,364 A | * | 8/1991 | Deegan | ..................... 56/320.2 |
| 5,048,279 A | * | 9/1991 | Badawey et al. | .......... 56/320.2 |
| 5,133,175 A | * | 7/1992 | Dumbrell | .................... 56/17.4 |
| 5,284,007 A | * | 2/1994 | Poe et al. | .................. 56/320.2 |
| 5,657,620 A | * | 8/1997 | Thagard et al. | .............. 56/15.2 |
| 5,826,417 A | * | 10/1998 | Evans | ....................... 56/320.2 |

* cited by examiner

*Primary Examiner*—Árpán F Kovács
(74) *Attorney, Agent, or Firm*—Allen, Dyer, Doppelt, Milbrath & Gilchrist, P.A.

(57) ABSTRACT

The discharge chute opening and closing apparatus for lawn mowers comprises a vertical bar fixedly attached to a pivot bar, rotatably mounted between first and second pivot stanchions; a pivot arm fixedly attached to the pivot bar at a first end and engaged with a cam pin at a second end; a cam plate comprising a cam pin and a drive pin, rotatably attached to a third pivot stanchion; a lift plate rotatably attached to the third pivot stanchion and fixedly attached to a chute door being operably engaged by the cam and drive pins; a second lift plate fixedly attached to a fourth pivot stanchion further comprising a spring attachment; a spring attached at a first end to the spring attachment of the lift plate and attached at a second end to a spring mounting bracket wherein the spring assists in maintaining the position of the chute door.

20 Claims, 12 Drawing Sheets

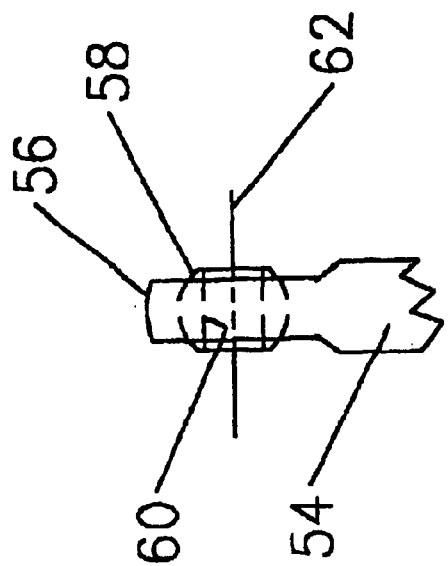
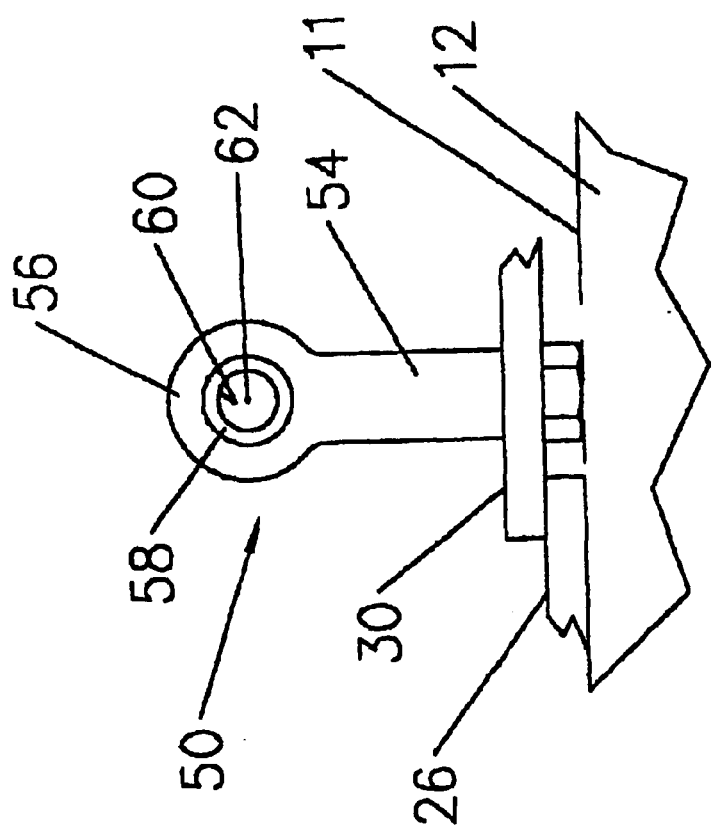

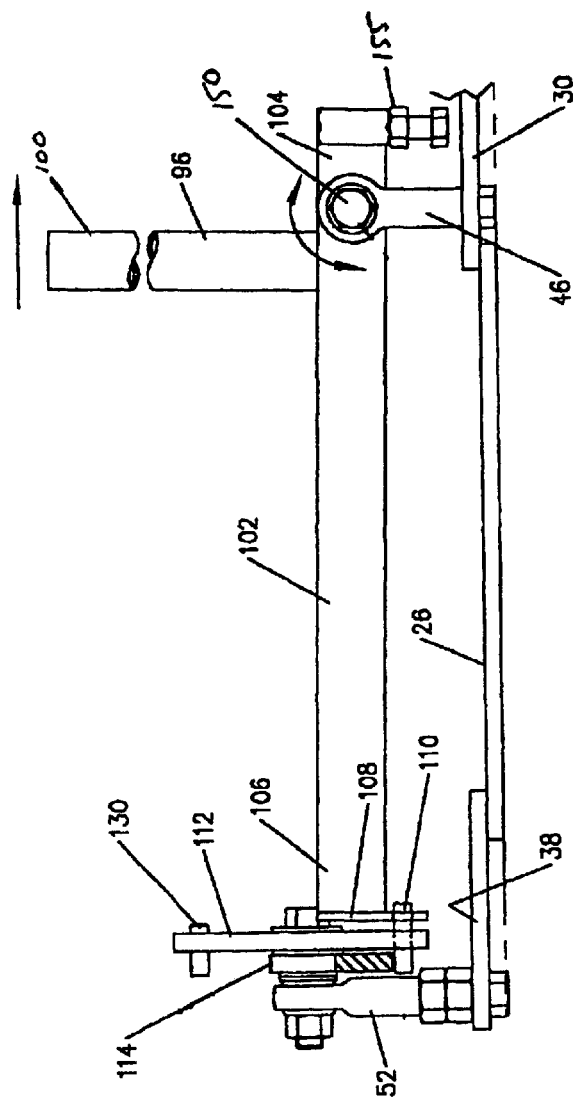
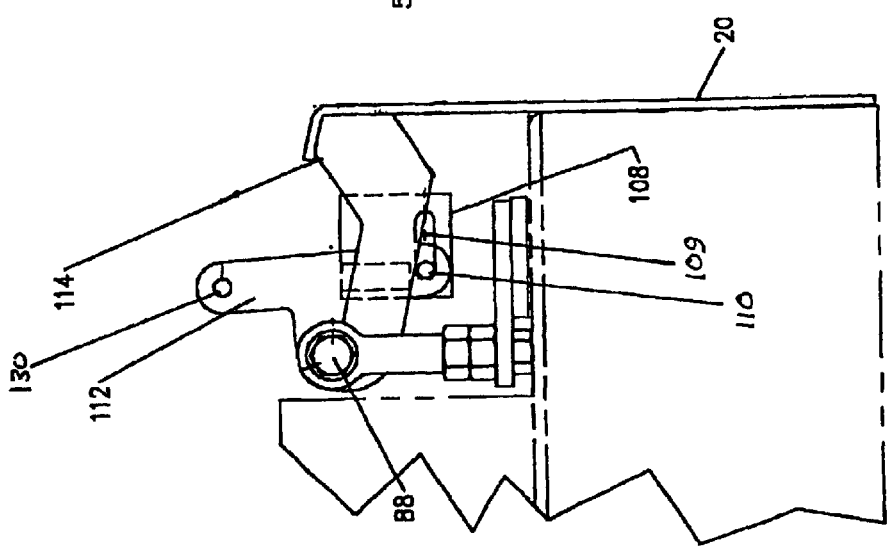
FIG. 13B
FIG. 13A

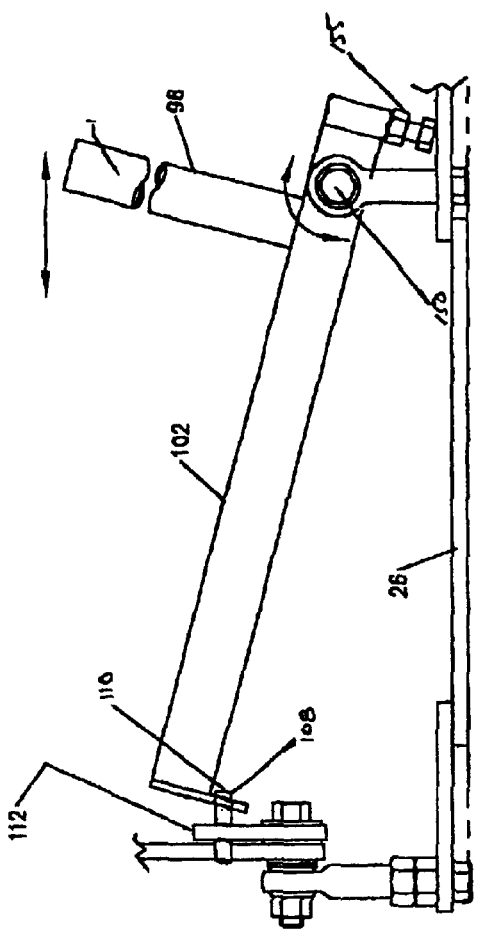
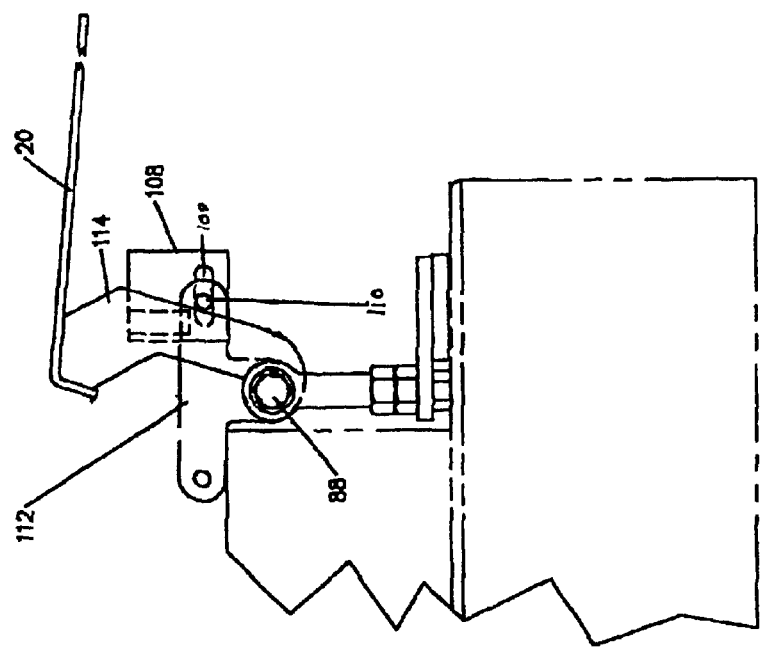
FIG. 14B
FIG. 14A

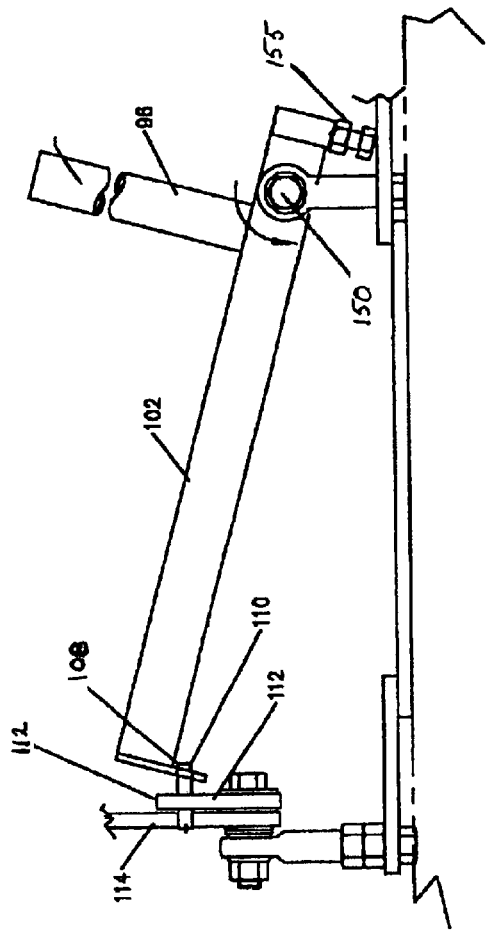
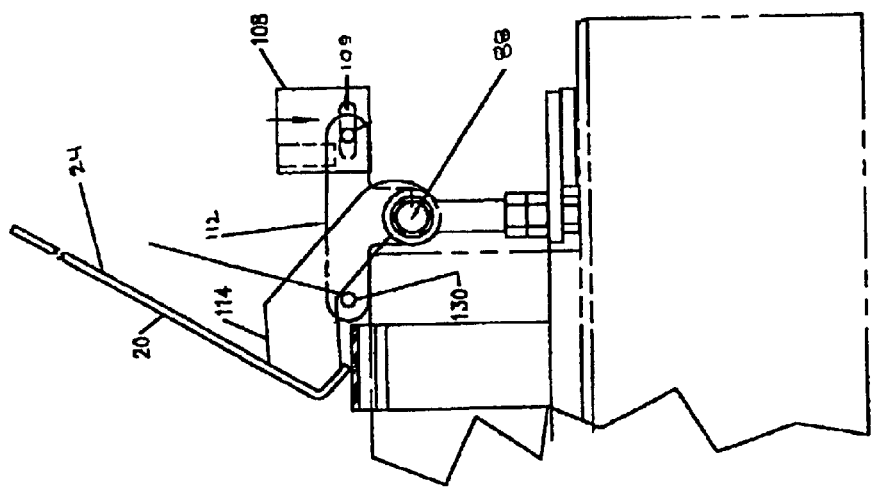
FIG. 15B
FIG. 15A

LAWN MOWER CHUTE OPENING APPARATUS AND METHOD

CROSS REFERENCE TO A RELATED APPLICATION

This application claims the benefit of U.S. Provisional Patent Application Ser. No. 60/421,460 filed Oct. 25, 2002.

FIELD OF THE INVENTION

The subject invention pertains generally to lawn mower apparatus, and in particular relates to an apparatus and a technique for quickly opening a lawn mower chute.

BACKGROUND OF THE INVENTION

Power operated lawn mowers typically have a shroud with depending sides that extend over and surround the rotating cutter blades within the shroud. Typically, the shroud is fitted with a discharge chute through which the cut grass exits to be either passed to a collection container for later disposal, or is deposited on the lawn in the form of mulch. In certain areas, however, it is imprudent to leave the discharge chute open; such situations exist when the lawn mower is being used near buildings or around people, as small stones or other dangerous objects may be discharged at a relatively high velocity, causing damage or injury.

To counter this problem, the prior art has developed a number of techniques for permitting the discharge chute to be alternately opened and closed in a relatively rapid manner. Examples of such prior art arrangements are disclosed below. As more fully explained herein, these arrangements suffer from various drawbacks.

U.S. Pat. No. 4,135,351 to Akgulian discloses a rotary lawnmower grass mulcher assembly having a mower housing and a discharge opening covered by a pair of plates having air holes there through. The air holes are offset between the two plates, which allows for the discharge of air while maintaining the grass clippings in the mower housing for mulching.

U.S. Pat. No. 4,45,312 to Cartner discloses a mower head with movable guard for an articulated boom assembly attached to a mow tractor. The movable guard may be opened via a hydraulic means for allowing the mower blade to cut saplings and the like.

U.S. Pat. No. 5,040,364 to Deegan discloses a lawnmower having a selectable discharges means. The lawnmower described comprises a cutting deck having a plurality of discharge exit ports, each covered with a closure means. Each closure means is connected to a control lever, which operates to open and close the closure means via a cable attachment.

U.S. Pat. No. 5,048,279 to Badawey et al. discloses a leaf mulcher for use with a rotary blade power lawnmower. The leaf mulcher comprises a screen, which covers the outlet of the lawnmower. The screen is offset to provide a space between the outlet and the screen thereby allowing a portion of the grass clippings to escape from outlet without passing through the screen.

U.S. Pat. No. 5,133,175 to Dumbrell discloses a safety flap for power-operated lawnmower the apparatus remains in the closed position due to the force of gravity.

U.S. Pat. No. 5,284,007 to Poe et al. discloses a mulching and shredding attachment for the use on a lawnmower or lawn vacuum, which is held in place by a bracket comprising a lever and a clevis pin. Removal of the pin allows for the apparatus to be engaged or disengaged.

U.S. Pat. No. 5,657,620 to Thagard et al. discloses a device for mowing, cutting and mulching. The device is generally attached to a tractor power drive, and comprises a shroud mechanism that may be mechanically opened. When the shroud mechanism is mechanically opened it exposes the cutting means for removing brush and saplings.

Finally, U.S. Pat. No. 5,826,417 to Evans discloses an operator control deflector plate for the discharge chute of a riding lawnmower. The deflector plate comprises a series of air holes large enough to allow the passage of grass, however, small enough to prevent the passage of objects sufficient to cause physical injury or property damage. The device may be selectively opened by a lever mechanism mounted to the lawnmower cutting deck.

Despite these prior art efforts, there remains a need for discharge chute opening and closing apparatus that is rugged and operates to quickly move the cover for the discharge chute between the open and closed positions. All documents and publications cited are incorporated by reference to the extent not inconsistent with the explicit teachings set forth herein.

BRIEF SUMMARY OF THE INVENTION

It is an object of the present invention to provide a discharge chute opening and closing apparatus for lawn mowers that is rugged, reliable and operates to quickly open and close the discharge chute.

The discharge chute opening and closing apparatus for lawn mowers comprises, in combination, the following: a vertical bar fixedly attached to a pivot bar, rotatably mounted between first and second pivot stanchions; a pivot arm fixedly attached to said pivot arm at a first end and engaged with a cam pin at a second end; a cam plate comprising a cam pin and a drive pin rotatably attached to a third pivot stanchion; a lift plate rotatably attached to the third pivot stanchion and fixedly attached to a chute cover being operably engaged by the cam and drive pins; a second lift plate fixedly attached to a fourth pivot stanchion further comprising a spring attachment; a spring attached at a first end to the spring attachment of the lift plate and attached at a second end to a spring mounting bracket wherein the spring assists in maintaining the position of the chute cover.

The vertical bar has a first end defining a handle and a second end fixedly attached to a pivot bar for translating torque from the operator to the pivot bar. When engaged by the user, the handle operates to open and close the chute cover. The pivot bar is rotatably disposed between a first pivot stanchion and a second pivot stanchion and is further attached to a generally horizontal pivot arm. Movement of the vertical handle translates to movement of the pivot arm.

The horizontal pivot arm has a first end attached to the pivot bar and a second end comprising a crank plate. The crank plate further defines an aperture that receives a a first end of a cam pin. Movement of the pivot arm translates torque to the cam pin, which is fixedly attached through and causes rotation of a cam plate. The cam plate is rotatably attached to a third pivot stanchion and comprises a cam pin and a drive pin. As the cam plate is rotated about its axis, a second end of the cam pin engages and raises a first lift plate attached to the chute cover door.

The chute cover door fixedly attached to the first lift plate and a second lift plate wherein the second lift plate is rotatably attached to a fourth pivot stanchion. When closed, the chute cover door is generally in a substantially vertical position. When opened, the chute cover door is opened past the horizontal position to allow for the unimpeded discharge of grass clippings.

The opposite movement of the handle generally closes the apparatus. The pivot arm essentially pushes down on the cam pin and the cam plate is rotated in an opposite direction. As the cam plate rotates the drive pin engages the lift plate and pushes the lift plate forward wherein gravity or an attached spring operates to complete the closing process.

By way of example, the apparatus may further comprise a spring attached between the second lift plate and a spring mount to facilitate the opening of the chute door. The spring can be mounted to provide constant tension between the lift plate attached to the chute door and the spring mount attached to the cutting deck. When the apparatus closed, the spring can operate to maintain the chute cover in the closed position. When the chute cover apparatus is opened, the spring can operate to maintain the chute cover in the open position.

The apparatus may include a staybar that allows for the partial opening of the apparatus when in operation. The staybar can be attached to a lift plate and provide structural support therefore. The staybar can comprise a design having an offset center of gravity that allows the staybar to maintain an upright position as the apparatus is opened slowly. The staybar can maintain this upright position until the chute cover reaches a critical angle, then the staybar will rotate allowing for the chute cover to fully close. Such a feature is particularly helpful when a partial discharge of grass clippings is desired.

In a further embodiment the apparatus can comprise a stop bolt attached to an end of the pivot arm to prevent the pivot arm from over rotating and becoming disengaged from the cam pin.

In another embodiment a limiting means may be installed to prevent the chute cover from over rotating and causing damage to the components. In a preferred embodiment the limiting means comprises a shock pad made from a resilient material such as rubber, nylon, plastic or the like for eliminating or reducing the wear caused by two metal parts coming into abrupt contact with one another.

Further objects and advantages of the present invention will become apparent by reference to the following detailed disclosure of the invention and appended drawing wherein like reference numbers refer to the same feature, component, or element.

BRIEF DESCRIPTION OF THE DRAWINGS

FIG. 4 is a side plan view of a pivot upright assembly of the present invention.

FIG. 5 is a front plan view of a pivot upright assembly of the present invention.

FIG. 13A is a side fragmentary view of the cam plate/lift plate assembly of the present invention in the closed position.

FIG. 13B is a front fragmentary view of the pivot arm assembly of the present invention in the closed position.

FIG. 14A is a side fragmentary view of the cam plate/lift plate assembly of the present invention in the partially opened position.

FIG. 14B is a front fragmentary view of the pivot arm assembly of the present invention in the partially opened position.

FIG. 15A is a side fragmentary view of the cam plate/lift plate assembly of the present invention in the partially opened position.

FIG. 15B is a front fragmentary view of the pivot arm assembly of the present invention in the fully opened position.

DETAILED DESCRIPTION OF THE INVENTION

Figure 1:
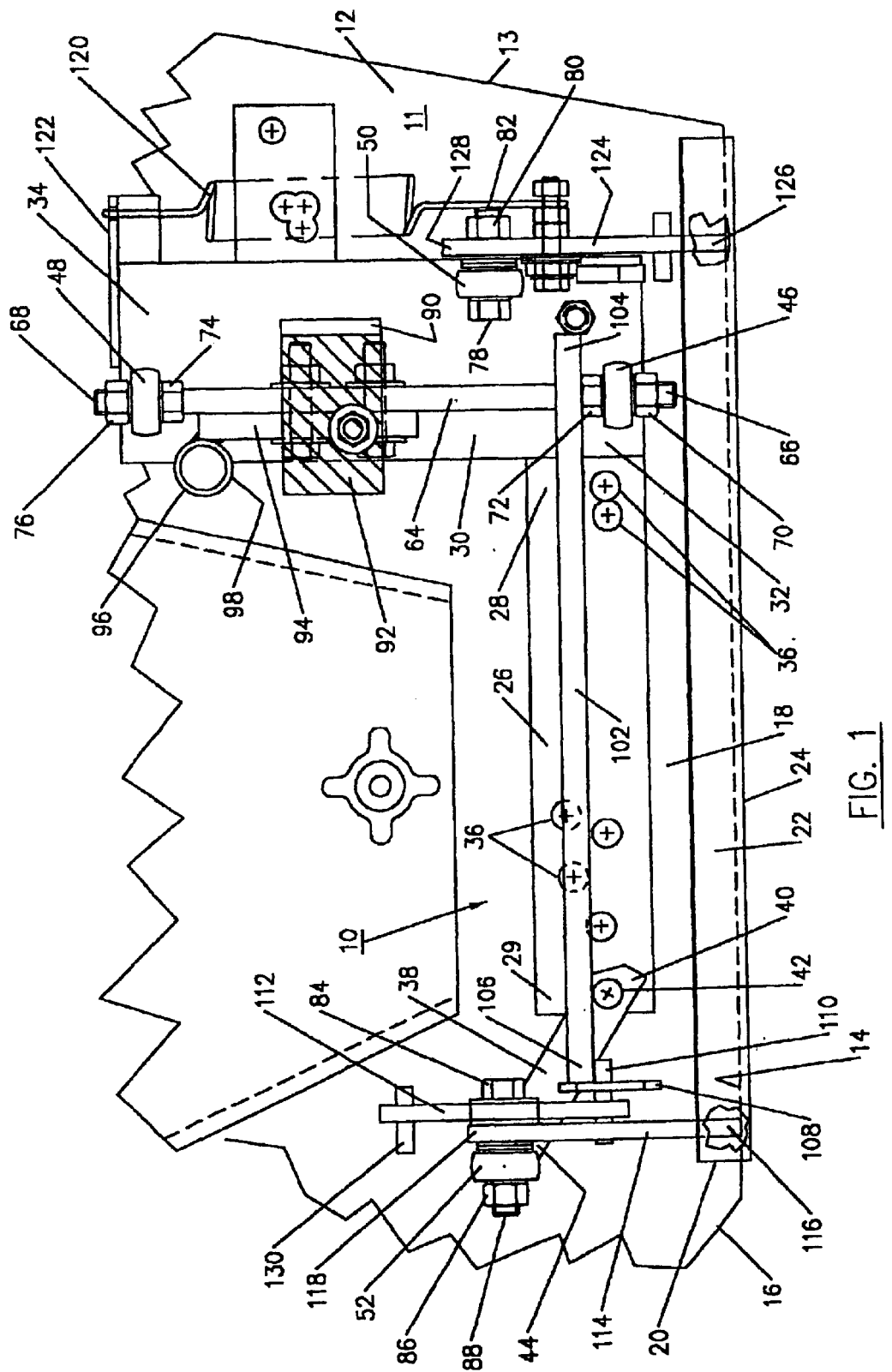
FIG. 1 is a top plan view of the discharge chute opening and closing apparatus according to the present invention, fitted to the shroud of a lawn mower.

Referring now to FIG. 1, an opening and closing lawnmower chute cover apparatus is illustrated and generally designated by the reference numeral 10.

The apparatus 10 is designed for use with a lawn mower having a shroud 12 with an upper, generally horizontal surface 11 and a generally vertical depending skirt 13. The shroud 12 includes a chute opening 14 (shown by dotted line in FIG. 1) along a side 16 in the skirt 13. The opening and closing apparatus 10 is fitted along an area 18 of the shroud upper surface 11 which extends generally parallel with the chute opening 14.

The apparatus 10 is provided with a chute cover 20 which comprises a first chute cover portion 22 extending across and generally parallel with the area 18 and a second portion 24 extending generally vertically over the chute opening 14 and parallel with side 16, when the chute cover 20 is in the closed position, as depicted in FIG. 1.

The apparatus 10 comprises a first plate 26 having opposing ends 28, 29, a second plate 30 having opposing ends 32, 34 and an extension plate 38 having opposing ends 40, 44. As depicted in the drawings, the first plate 26 lies along the upper shroud surface 11 in the area 18 generally parallel with the side 16, the second plate 30 lies generally perpendicular to the side 16 along the shroud surface 11 and the extension plate 38 is fitted at its first end 40 via fastener 42 to the second end 29 of plate 26, with the second end 44 of extension plate 38 extending angularly away from the side 16 along shroud surface 11. It will of course be understood by those skilled in the art that the plates 26, 30 and 38 may be formed of a unitary plate member. The plates 26, 30 and 38 are attached to the shroud 12 via fasteners, such as fasteners 36 and 42.

In accordance with the present invention, the apparatus 10 comprises at least four pivot uprights 46, 48, 50 and 52. The first pivot upright 46 is fixed to and extends generally vertically from the proximal end 32 of the second plate 30 and the second pivot upright 48 is fixed to and extends generally vertically from the second end 34 of the second plate 30. The third vertical upright 50 is attached along the second plate 30 in spaced relation to the first upright 46, and rearwardly with respect to the side 16 of shroud 12, as shown in FIG. 1. The fourth pivot upright 52 is attached to the distal end 44 of the extension plate 38.

Figure 2:
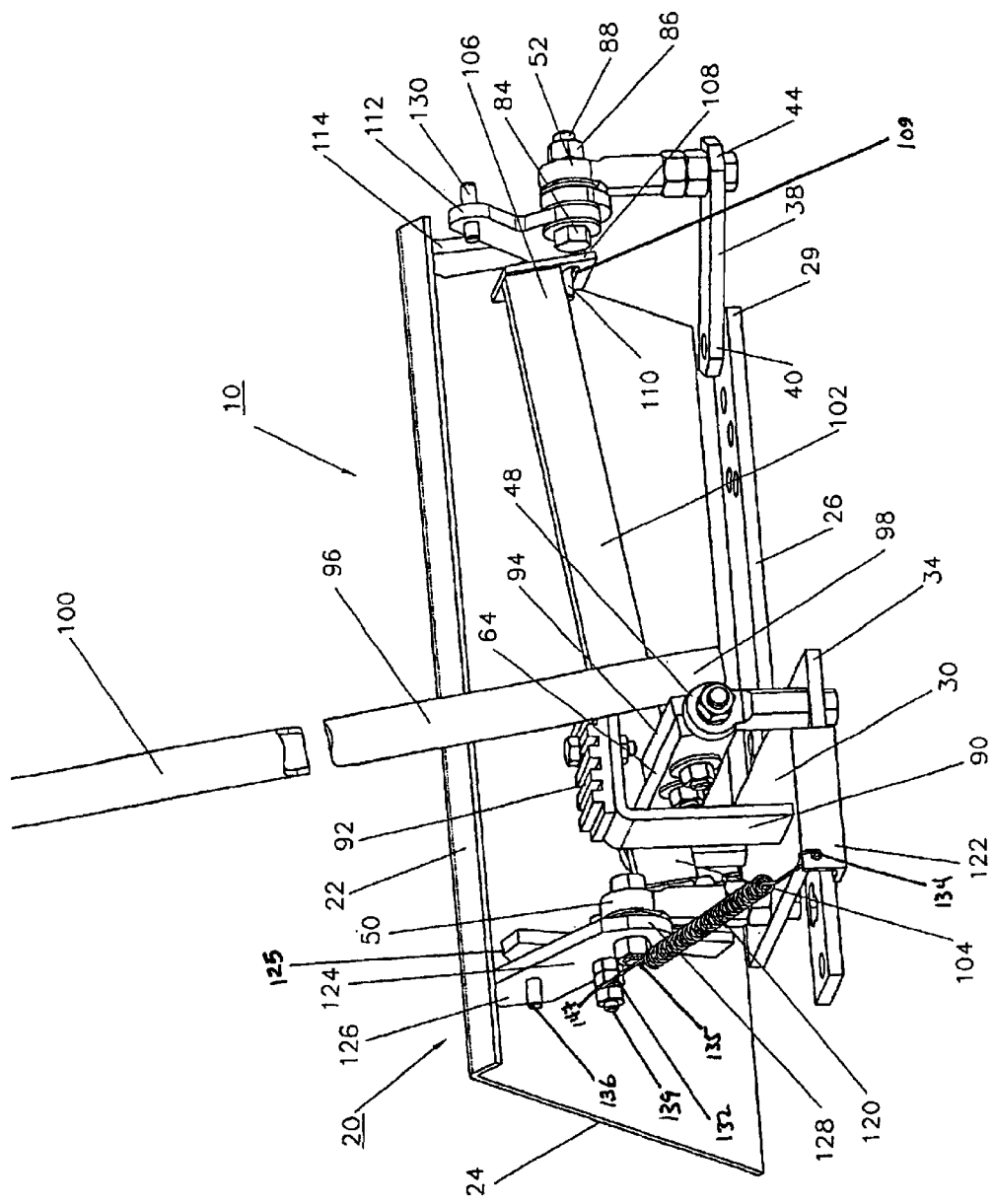
FIG. 2 is a rear perspective view of the apparatus shown in accordance with the present invention.

Referring next to FIGS. 4 and 5, with specific reference to pivot upright 50, each pivot upright 46, 48, 50 and 52 includes a stanchion 54 atop which is affixed a bearing support member 56 into which is fitted a generally circular bearing 58 with a central bore 60. It will be understood by those skilled in the art that the construction details of the pivot uprights 46, 48, 50 and 52 are all identical to that shown specifically with reference to pivot upright 50 in FIGS. 2 and 3. Each of which is adapted to rotatably support a cylindrical shaft that is rotatable about a central axis 62 extending through the opening 60 in the corresponding pivot upright.

Referring again to FIG. 1, the pivot uprights, 46, 48 fixed to the opposing ends of plate 30 rotatably support a main pivot bar 64 having a first end 66 which is pivotally secured with the first pivot upright 46 and a second, distal end 68 which is pivotally secured with the second pivot upright 48, so that the main pivot bar 64 is rotatably suspended between uprights 46 and 48 above the surface of the plate 30. The positioning of the main pivot bar 64 is maintained at the respective ends 66 and 68 thereof via lock nuts 70 (at end 66) and bolt 72 welded to pivot arm 102 near end 104, and lock nut 76 (at end 68) and bolt 74 welded to pivot bar 64 at end 68, together with corresponding threads on those ends. Similarly, as shown on the right side of FIG. 1, pivot upright 50 has associated lock nuts 78, 80 pivotally supporting pivot rod 82, and pivot upright 52 has associated lock nuts 84, 86 which hold in place pivot rod 88. Rods 82 and 88 together with associated hardware are described in greater detail below.

Turning again to the construction details of the apparatus 10 associated with the second plate 30, an upstanding bracket 90 is fixed to the upper surface of the second plate 30 and extends above the main pivot bar 64 so as to support a shock pad 92 above the main pivot bar 64. As is evident from FIG. 2, the shock pad 92 supports the chute cover 20 by engaging the first portion 22 when the chute cover 20 is in an open position.

With continuing reference to FIG. 1, a brace 94 is fixed along the main pivot 64 and has a generally vertical handle 96 fixed thereto at a proximal, lower end 98 of the handle. As will be appreciated by those skilled in the art, the upper, distal extremity 100 of the handle 96 can be used by an operator to effectuate a rotation of the main pivot bar 64, which in turn effectuates rotation of pivot arm 102 about its proximal end 104 which is, in turn, fixed to the main pivot bar 64 in abutting relationship with bolt 72 associated with pivot upright 46. At the same time, the opposing, distal end 106 of pivot arm 102 is rotated away from the area 18 of shroud surface 11. A cam plate assembly including cam plate 112 and crank plate 108 are cooperatively attached with the distal end 106 of the pivot arm 102, so as to effectuate the raising and lowering of lift plate 114. Lift plate 114 is fixed at a first end 116 to the first portion 22 of chute cover 20, and at the opposing end 118 is pivotally mounted along shaft 88 associated with pivot upright 52. Therefore, when the upper extremity 100 of the handle 96 is moved in a direction generally parallel with the direction of the side 16 and chute opening 14, the main pivot bar 64 is rotated in the manner described above so as to lift the distal end 106 of the pivot arm 102, thereby effectuating the raising or lowering of the cover 20. The cover 20 is shown in the closed position in FIG. 1; when raised to the open position, the first surface 22 of the cover 20 rests upon the shock pad 92.

Figure 3:
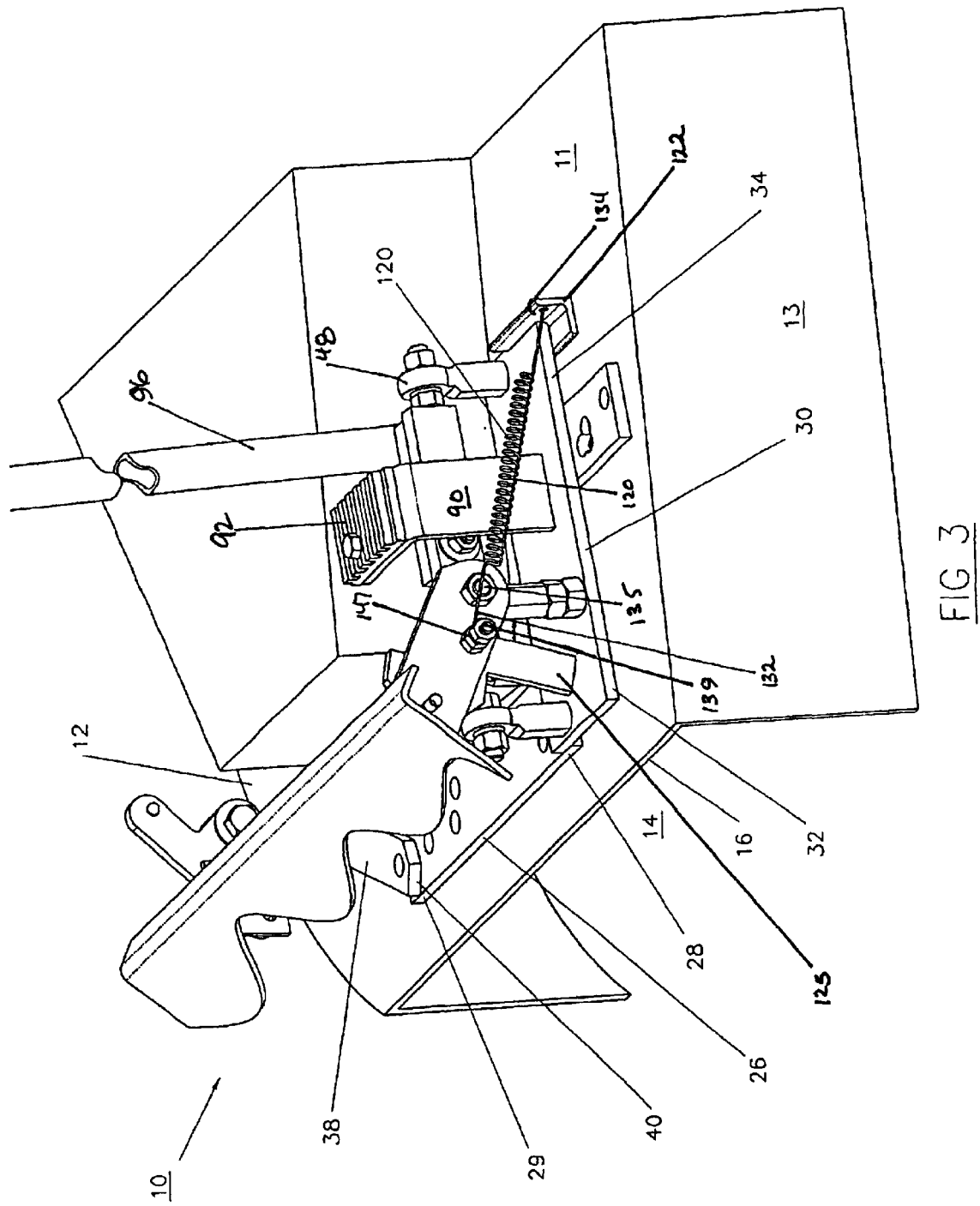
FIG. 3 is a side perspective view of the apparatus according to the present invention, with the chute cover removed.
Figure 6:
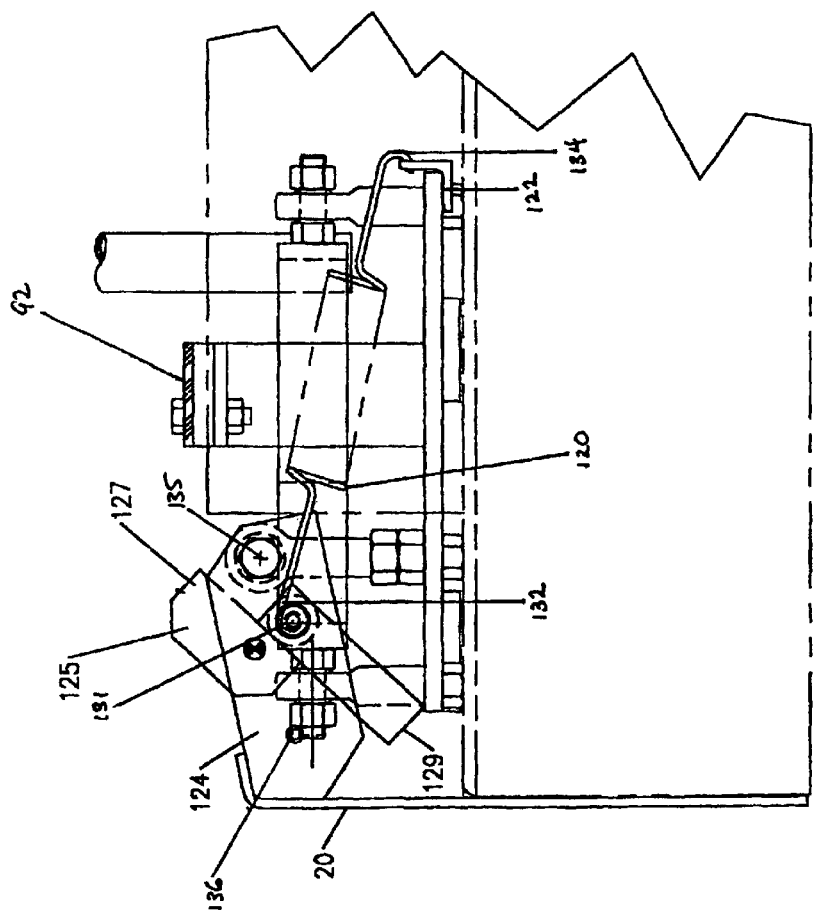
FIG. 6 is a side fragmentary view of the chute cover assembly of the present invention.
Figure 9:
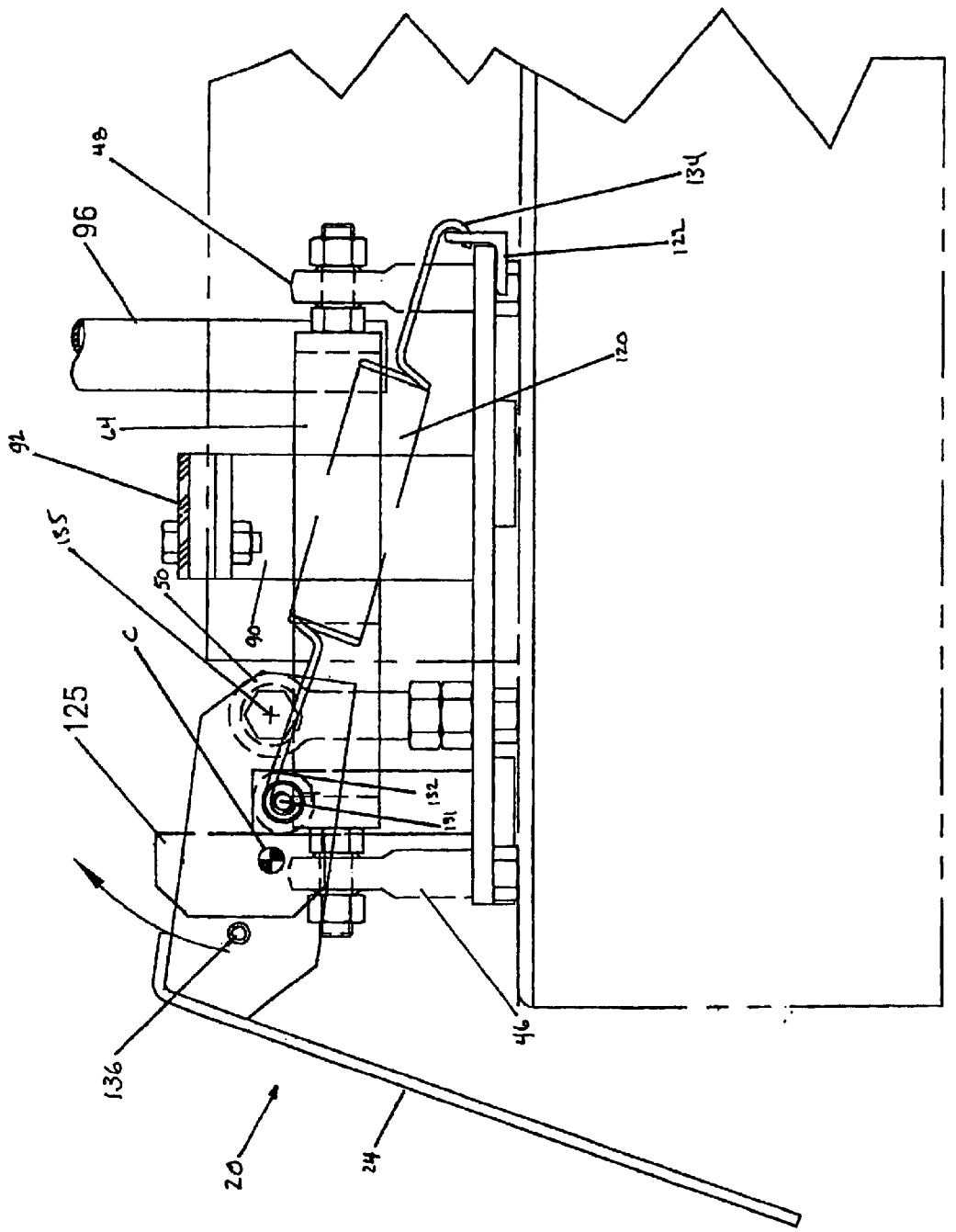
FIG. 9 is a side fragmentary view illustrating a one-quarter opened chute cover assembly.
Figure 10:
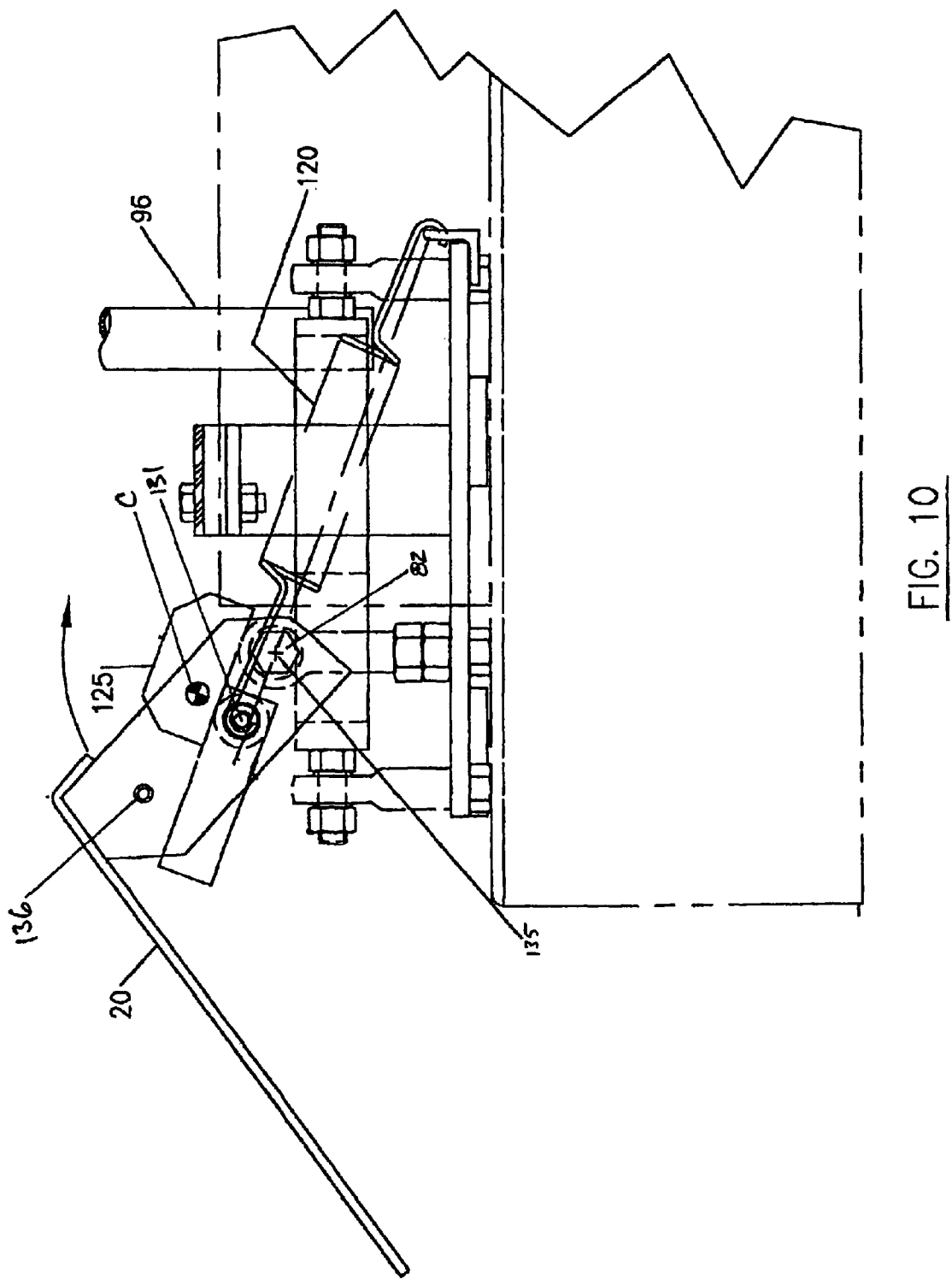
FIG. 10 is a side fragmentary view illustrating a half opened chute cover assembly.
Figure 11:
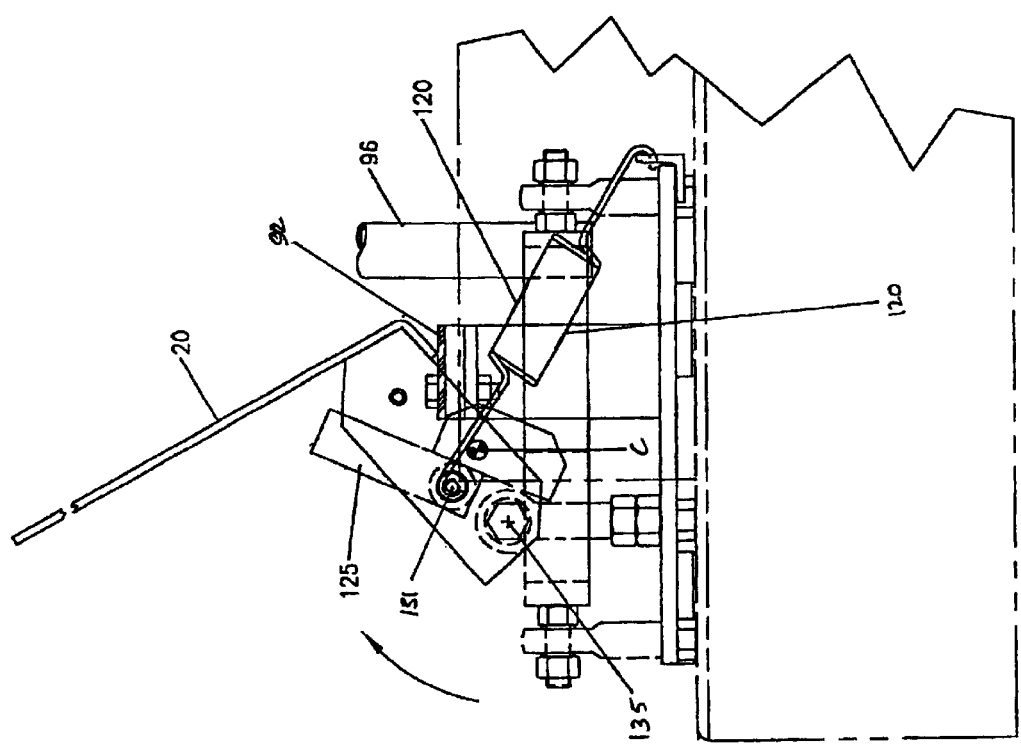
FIG. 11 is a side fragmentary view illustrating a fully opened chute cover assembly.

Turning now to FIGS. 6 and 3, the apparatus 10 is shown in a closed position. As can be seen from FIG. 6, the spring 120 is attached at a first end 132 to an extension 147 of the pivot point 131 of the staybar 125 and at a second end 134 to the spring mounting bracket 122. When in the closed position, the spring 120 operates under tension to pull the chute cover 20 closed, thus maintaining its position. This is caused by the spring 120 being attached to a point 133 on the lift plate 124 that is lower than the lift plate pivot point 135. As the chute cover 20 begins to open, as depicted in FIG. 9, the spring 120 begins to stretch. As the chute cover 20 is opened further, as depicted in FIG. 10, the spring 120 is under its highest tension as the lift plate 124 passes the apex of the rotation about the lift plate pivot point 135. As the pivot point 131 of the staybar 125 passes the apex of the lift plate 124 rotation, the spring 120, under tension acts to now pull the chute cover 20 to an open position. At this point, the spring 120 operates to maintain the chute cover 20 in an open position, as depicted in FIG. 11. The chute cover 20 will remain in the open position until such time as the handle 100 is moved in the opposite direction to effectuate the closing of the chute cover 20.

As is shown in FIG. 11, the first chute cover portion 22 comes to a rest at a shock pad 92 that operates to limit the rotation of the chute cover 20. The shock pad is attached to an upstanding bracket 90 and can comprise a resilient material to reduce the amount of wear caused by abrupt metal-to-metal contact.

Figure 7:
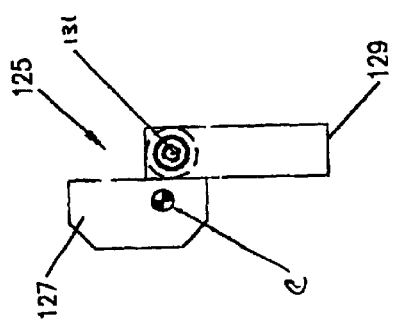
FIG. 7 is a side plan view of the staybar of the present invention.

Referring next to FIG. 7, the staybar 125 comprises a lower end 129 and an upper end 127. The pivot point 131 of the staybar 125 passes through the upper portion of the lower end 129. Because of the configuration of the staybar 125, its center of gravity C ensures that the staybar 125 maintains the appropriate of the chute cover 20.

When the apparatus 10 is partially engaged by the operator, the position of the staybar 125 is changed and the staybar 125 moves from an angled resting position, as depicted in FIG. 6, to an upright position, wherein the lower end 129 of the staybar 125 is generally flat against the surface 11 of the second plate 30. In this position the staybar 125, through its connection 133 with the lift plate 124 maintains the chute cover 20 in a partially opened position.

To reset the staybar 125, the chute cover 20 should be fully opened. When the chute cover is 20 is sufficiently opened, the stop pin 136 engages the upper end 127 of the staybar 125 and rotates it in the same direction as the chute cover 20. When the center of gravity C rotates over and beyond the pivot point 131 of the staybar 125, the upper end 127 of the staybar 125 rotates entirely over as a result of gravity. At this point, the staybar 125 is reset and when the operator closes the chute cover 20, the chute cover 20 will close entirely.

Figure 8:
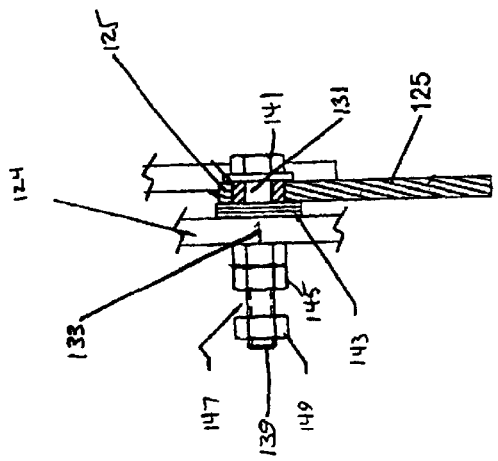
FIG. 8 is a front sectional view of the staybar/lift plate assembly of the present invention.

Referring now to FIG. 8, the staybar 125 and lift plate 124 assembly is shown. Through the lift plate 124 and staybar 125 pivot point 131 passes a through bolt 139 held in place by a first lock nut 141, spaced by washers 143 and secured by a pair of jam nuts 145A, 145B. The through bolt 139 is extended beyond the jam nuts 145A, 145B and further comprises a spring attachment point 147 and a second lock nut 149.

Turning next to FIG. 9, as the chute cover 20 is opening, the pivot arm 102 is activated by handle 96 that actuates crank plate 108 by engaging the cam pin 110, as depicted in FIGS. 13A and 13B. At rest the pivot arm 102 is in a generally horizontal position. When rotated about the pivot arm axis 150, the distal end 106 of the pivot arm 102 is elevated. The crank plate 108 attached to the distal end 106 of the pivot arm 102 engages the cam pin 110 on a first side through the aperture 109. As the pivot arm 102 is raised, the crank plate 108, in combination with the cam pin 110, operates to rotate the cam plate 112 about the cam plate pivot point 88.

As the cam plate 112 rotates, a second end of the cam pin 110 engages the lift plate 114, attached to the chute cover 20, and causes the lift plate 114 to rotate about pivot rod 88, as depicted in FIGS. 14A and 14B. Once the actual centerline of the spring 120 passes above the center of pivot rod 88, the tension of spring 120 continues the rotation of lift plate 114 until the chute cover 20 is completely open and contacts shock pad 92. It will be understood by those skilled in the art that the pivot arm 102 moves the chute cover 20 only to a rotation position where the spring attachment 147 passes the apex of rotation the center line of the pivot rod 82, and the spring 120 then completes the chute cover 20 opening process; otherwise, the chute cover 20 could only be fully opened as a result of the inertial moment of the chute cover rotation as a result of travel limitations of the pivot arm 102.

It will be appreciated by those skilled in the art that the over rotation of the pivot arm 102 will cause the cam pin 110 to exit the aperture 109 and disengage from the crank plate 108. To limit rotation of the pivot arm 120, stop bolts 155 may be attached the pivot arm 102, thereby decreasing the occurrence of detachment.

With continuing reference to FIG. 9, also note that when the chute 20 is partially open, the staybar 125 is rotated due to its offset center of gravity C. When the chute 20 is opened slowly, the staybar 125 rotates into the position shown in FIG. 9, holding the chute cover 20 in a partially open position, permitting the vertical handle to be released while the staybar 125 is in this position.

Reference is now made to FIG. 10; as the chute is rotated by the handle 96 to the position shown, the center line force of the spring has moved above the pivot point of the chute cover 20, and spring tension completes the chute cover 20 opening, as described above, without force being exerted on the handle 96. The position of the staybar 125 during that continued movement control is continued until the chute cover 20 is fully opened, as shown in FIG. 11.

Figure 12:
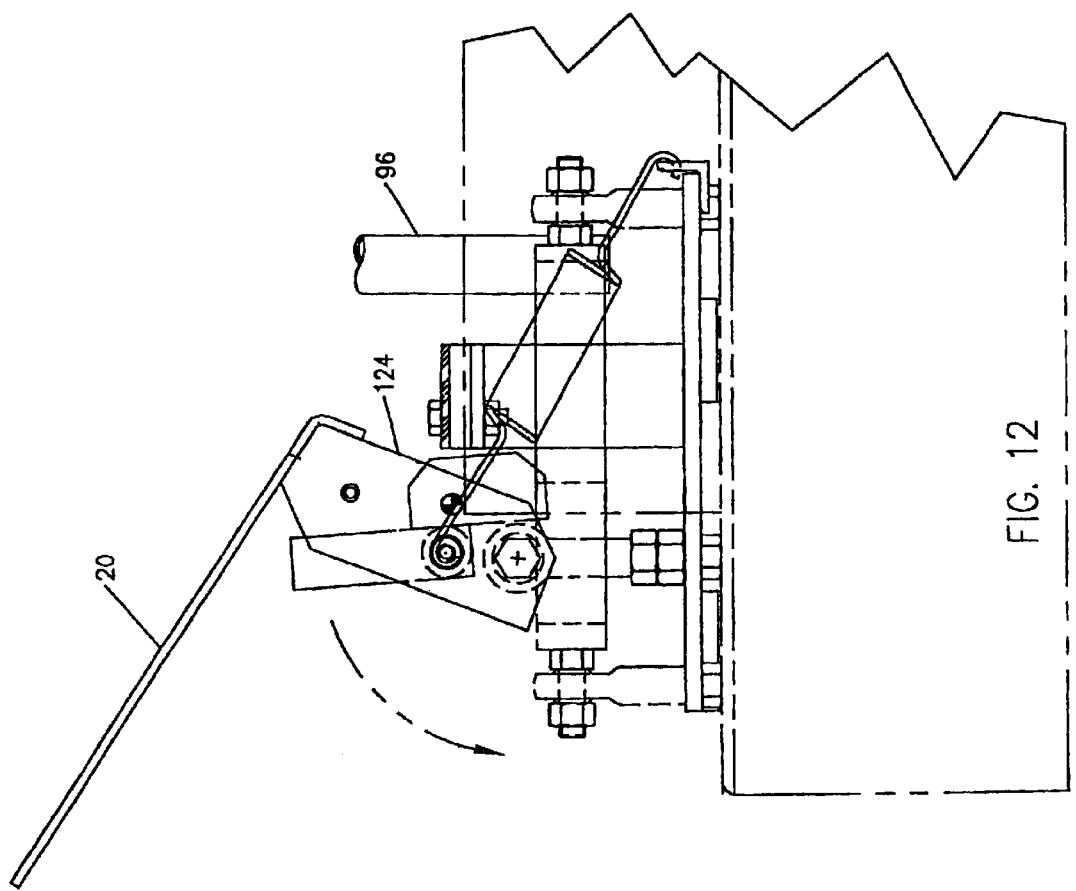
FIG. 12 is a side fragmentary view illustrating a one-quarter closed chute cover assembly.

Next referring to FIG. 12, the closing operation of the apparatus 10 will now be described. The pivot arm 102, when actuated by handle 96, actuates crank plate 108 by engaging the cam pin 110 of cam plate 112, causing rotational movement of the cam plate 112 until the cam pin 130 contact lift plate 114 and rotates it about the center line of pivot point 88, as depicted in FIGS. 15A and 15B. Rotation continues until the centerline of the spring 120 passes below the apex of the rotation about the pivot point 82; thereafter, spring tension continues the rotation of the lift plate 124 until the chute cover 20 is closed. As indicated in FIG. 12, the staybar 125 stays in the rotated position due to the inertia and the center of gravity C of the staybar 125. It will be noted that in the closing operation, the pivot arm 102 has travel limitations and relies upon the tension of the spring 120 to complete the closing of the chute 20 (i.e., the center line of the spring 120 must pass below the center of pivot point 82 in order to complete the closing of the chute 20).

Inasmuch as the preceding disclosure presents the best mode devised by the inventor for practicing the invention and is intended to enable one skilled in the pertinent art to carry it out, it is apparent that methods incorporating modifications and variations will be obvious to those skilled in the art. As such, it should not be construed to be limited thereby but should include such aforementioned obvious variations and be limited only by the spirit and scope of the following claims.

We claim:

1. A selective position lawn mower discharge chute cover comprising, in combination:
   a vertical bar having a first end defining a handle and a second end fixedly attached to a pivot bar wherein said pivot bar is rotatably disposed between a first pivot stanchion and a second pivot stanchion;
   a generally horizontal pivot arm having a first end attached to said pivot bar and a second end defining a crank plate wherein said crank plate further defines an aperture;
   a cam plate comprising a cam pin and a drive pin, wherein said cam plate is rotatably attached to a third pivot stanchion and wherein said cam pin is received in said crank plate aperture;
   a chute cover door fixedly attached to a first lift plate and a second lift plate wherein said first lift plate is rotatably attached to said third pivot stanchion and said second lift plate is rotatably attached to a fourth pivot stanchion; and
   a tension means for maintaining said chute cover in an open position when opened and a closed position when closed.

2. The selective position lawn mower discharge chute cover of claim 1 further comprising a staybar fixedly attached to said second lift plate.

3. The selective position lawn mower discharge chute cover of claim 2 wherein said staybar operates to maintain said chute cover door in a partially open position.

4. The selective position lawn mower discharge chute cover of claim 1 wherein said tension means comprises a spring fixedly attached at a first end to said second lift plate and attached at a second end to a spring retention bracket.

5. The selective position lawn mower discharge chute cover of claim 1 further comprising a limiting means to prevent over-rotation of the chute door when in an open position.

6. The selective position lawn mower discharge chute cover of claim 4 wherein said limiting means comprises a shock pad.

7. The selective position lawn mower discharge chute cover of claim 5 wherein said shock pad comprises a resilient material selected from the group consisting of rubber, plastic, nylon, vinyl, polyethylene and cork.

8. The selective position lawn mower discharge chute cover of claim 1 wherein said chute cover is mounted to the cutting deck of a lawn mower.

9. The selective position lawn mower discharge chute cover of claim 8 wherein said chute cover is mounted substantially perpendicular to the discharge flow of the lawn mower.

10. A selective position lawn mower discharge chute cover for mounting to the cutting deck of a lawn mower comprising, in combination:
    a vertical bar having a first end defining a handle and a second end fixedly attached to a pivot bar wherein said pivot bar is rotatably disposed between a first pivot stanchion and a second pivot stanchion;
    a generally horizontal pivot arm having a first end attached to said pivot bar and a second end defining a crank plate wherein said crank plate further defines an aperture;
    a cam plate comprising a cam pin and a drive pin, wherein said cam plate is rotatably attached to a third pivot stanchion and wherein said cam pin is received in said crank plate aperture;

a chute cover door fixedly attached to a first lift plate and a second lift plate wherein said first lift plate is rotatably attached to said third pivot stanchion and said second lift plate is rotatably attached to a fourth pivot stanchion; and a spring attached at a first end to said second lift plate and attached at a second end to a spring retention bracket wherein said spring retention bracket maintains constant tension on said spring.

11. The selective position lawn mower discharge chute cover of claim 10 further comprising a limiting means to prevent over-rotation of the chute door when in an open position.

12. The selective position lawn mower discharge chute cover of claim 11 wherein said limiting means comprises a shock pad.

13. The selective position lawn mower discharge chute cover of claim 12 wherein said shock pad comprises a resilient material selected from the group consisting of rubber, plastic, nylon, vinyl, polyethylene and cork.

14. The selective position lawn mower discharge chute cover of claim 10 wherein said chute cover is mounted to the cutting deck of a lawn mower.

15. The selective position lawn mower discharge chute cover of claim 8 wherein said chute cover is mounted substantially perpendicular to the discharge flow of the lawn mower.

16. A method of selectively opening or closing a lawn mower discharge chute cover apparatus comprising:

rotating a vertical bar from a first position to a second position, said vertical bar having a first end defining a handle and a second end fixedly attached to a pivot bar wherein said pivot bar is rotated between a first pivot stanchion and a second pivot stanchion and further rotates a pivot arm, said pivot arm having a first end attached to said pivot bar and a second end defining a crank plate wherein said crank plate further defines an aperture and engages a cam pin in a cam plate, said cam plate further comprising a drive pin, wherein said cam plate is rotated about a third pivot stanchion and engages a lift plate, said lift plate attached to a chute cover door further attached to a second lift plate rotating about a fourth pivot stanchion wherein said chute cover rotates between said third pivot stanchion and said fourth pivot stanchion, and attaching a spring at a first end to said second lift plate and attached at a second end to a spring retention bracket wherein said spring retention bracket maintains constant tension on said spring wherein the movement of said handle from a first position to a second operates to open said chute door and wherein movement of the handle in a second direction operates to close said door.

17. The method of claim 16 wherein said method further comprises attaching a limiting mean for said preventing over-rotation of the chute door when in an open position.

18. The method of claim 17 wherein said limiting means comprises a shock pad.

19. The method of claim 18 wherein said shock pad comprises a resilient material selected from the group consisting of rubber, plastic, nylon, vinyl, polyethylene and cork.

20. The method of claim 16 mounting an opening and closing apparatus substantially perpendicular to the discharge flow of said lawn mower.

* * * * *